(No Model.) 5 Sheets—Sheet 1.
T. W. CARRICO.
ODORLESS DRY OUTHOUSE AND APPARATUS FOR USE THEREWITH.
No. 393,294. Patented Nov. 20, 1888.
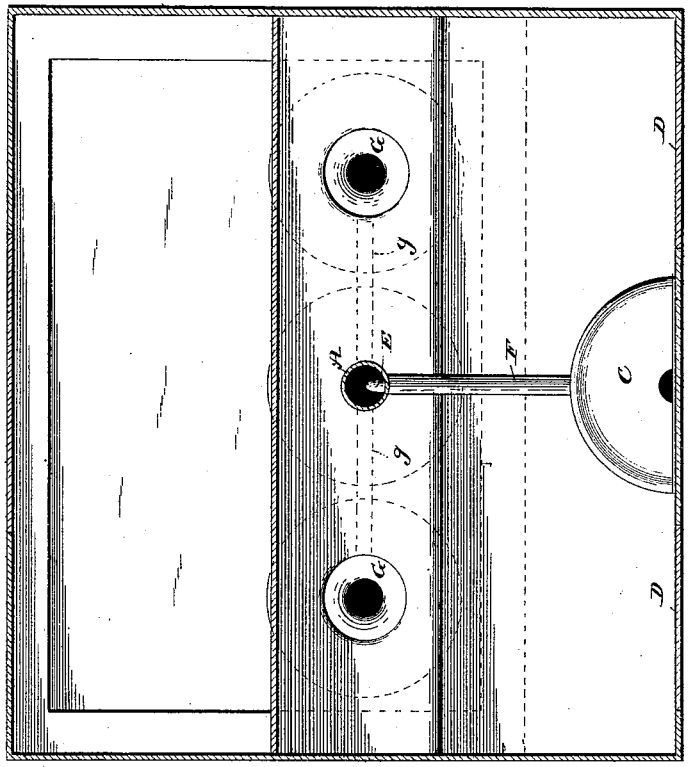
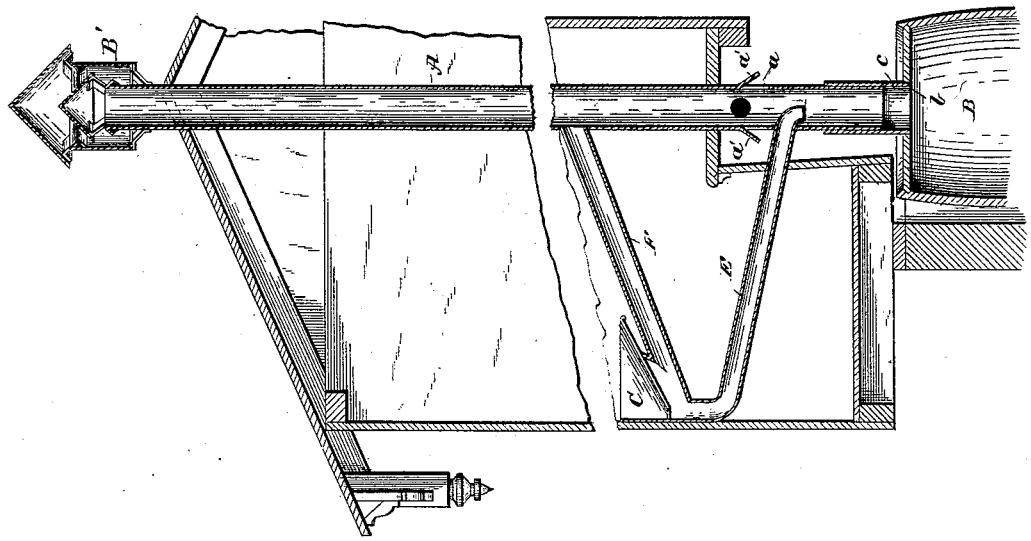
Witnesses,
Edwin L. Bradford.
Frank Dorian
Inventor.
Thos. W. Carrico,
By his Attorney in fact
Chas. E. Barber (No Model.) 5 Sheets—Sheet 2.
T. W. CARRICO.
ODORLESS DRY OUTHOUSE AND APPARATUS FOR USE THEREWITH.
No. 393,294. Patented Nov. 20, 1888.
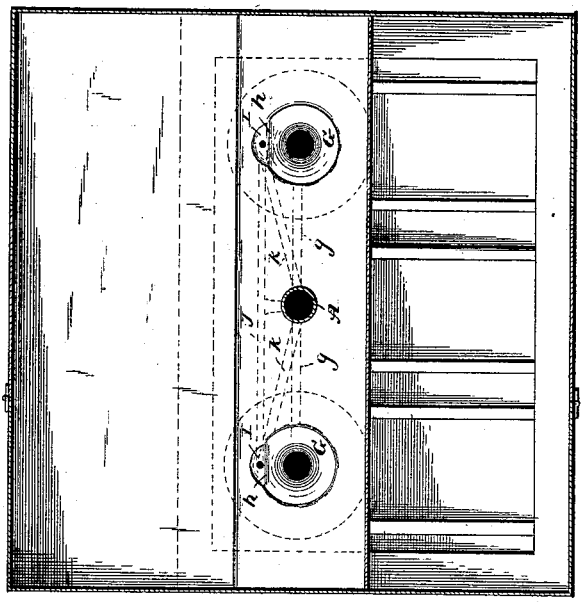
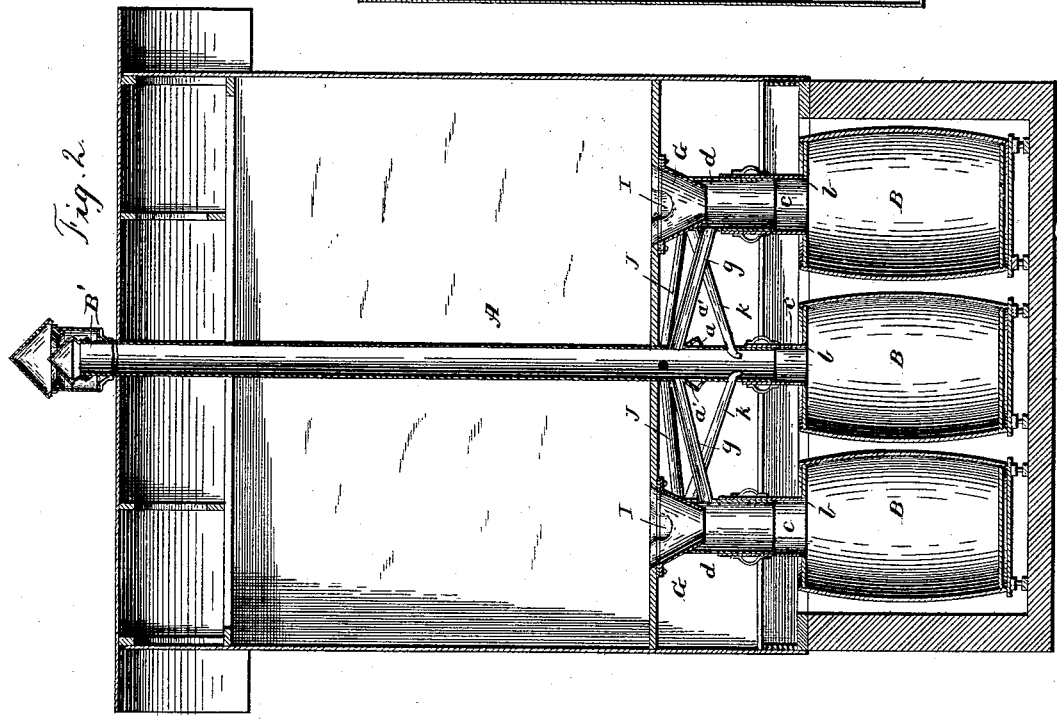
Witnesses,
Edwin L. Bradford
Frank Donian
Inventor,
Thomas W. Carrico.
By his Attorney in fact
Chas. E. Barbur (No Model.)  5 Sheets—Sheet 3.
T. W. CARRICO.
ODORLESS DRY OUTHOUSE AND APPARATUS FOR USE THEREWITH.
No. 393,294.   Patented Nov. 20, 1888.
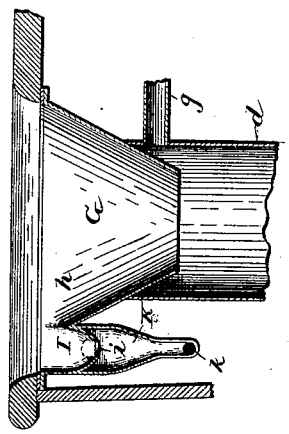
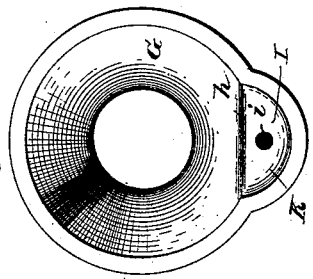
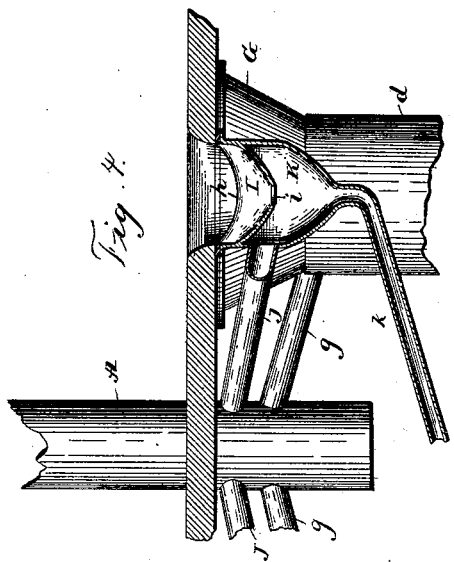
Witnesses.
Edwin L. Bradford.
Frank Dorian.
Inventor.
Thomas W. Carrico,
By his Attorney in fact
Chas. C. N. Barber.

(No Model.) 5 Sheets—Sheet 4.
T. W. CARRICO.
ODORLESS DRY OUTHOUSE AND APPARATUS FOR USE THEREWITH.
No. 393,294. Patented Nov. 20, 1888.
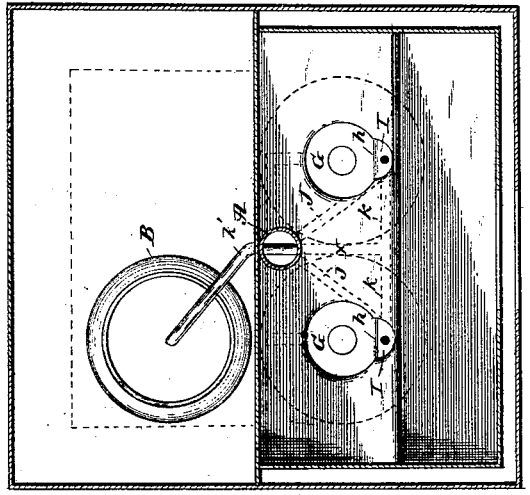
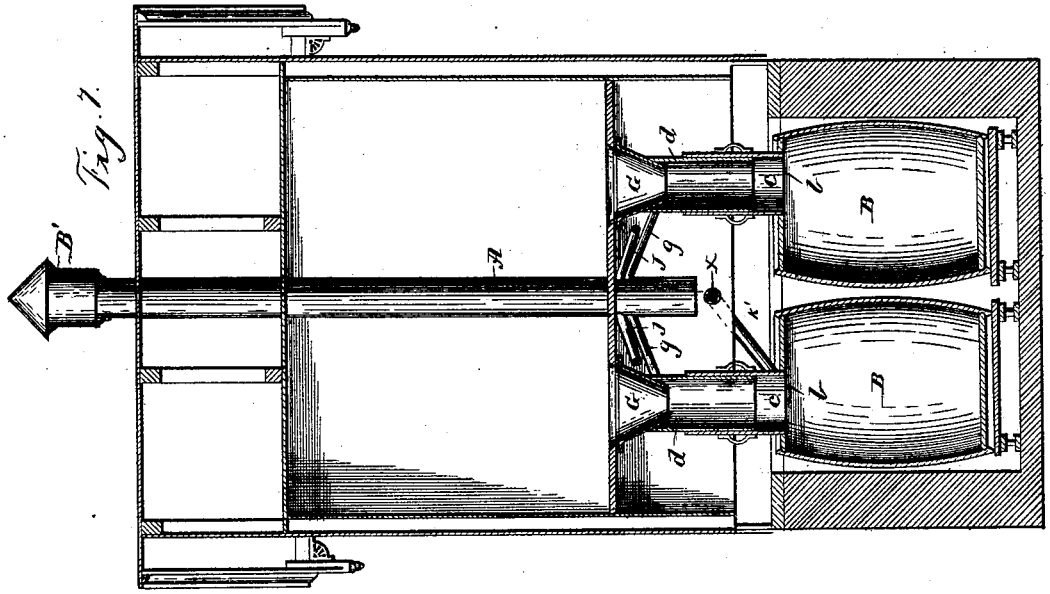
Witnesses.
Edwin L. Bradford.
Frank Dorian.
Inventor,
Thomas W. Carrico
By his Attorney in fact
Chas. E. Barbur (No Model.) 5 Sheets—Sheet 5.
T. W. CARRICO.
ODORLESS DRY OUTHOUSE AND APPARATUS FOR USE THEREWITH.
No. 393,294. Patented Nov. 20, 1888.
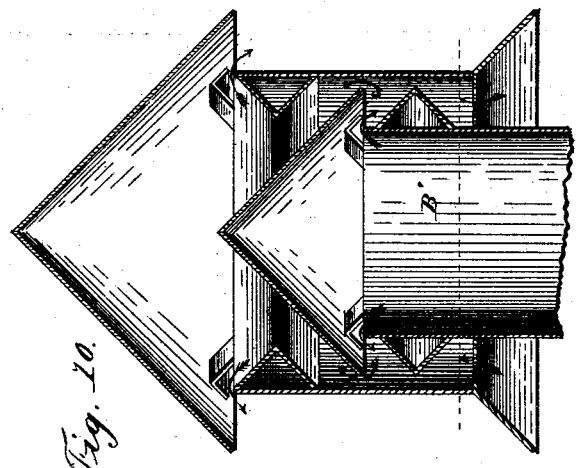
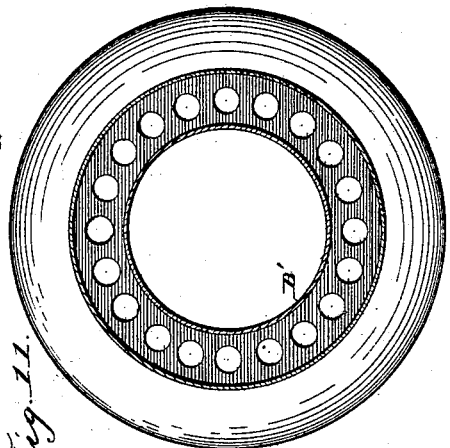
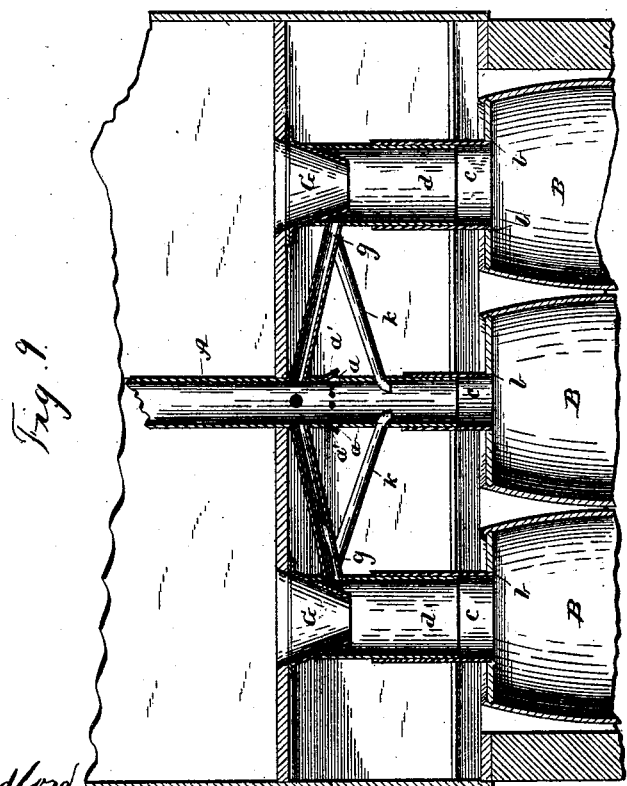
Witnesses,
Edwin L. Bradford.
Frank Dorian.
Inventor.
Thomas W. Carrico,
By his Attorney in fact
Chas. E. Barber.

UNITED STATES PATENT OFFICE.

THOMAS W. CARRICO, OF SAN ANTONIO, TEXAS.

ODORLESS DRY OUTHOUSE AND APPARATUS FOR USE THEREWITH.

SPECIFICATION forming part of Letters Patent No. 393,294, dated November 20, 1888.

Application filed March 7, 1888. Serial No. 266,476. (No model.)

*To all whom it may concern:*

Be it known that I, THOMAS W. CARRICO, a citizen of the United States, residing at San Antonio, in the county of Bexar, State of Texas, have invented certain new and useful Improvements in Odorless Dry Outhouses and Apparatus for Use therewith, of which the following is so full, clear, and exact a description as will enable others skilled in the art to which my invention appertains to make and use the same, reference being had to the accompanying drawings, in which—

Figure 1 is a view of an outhouse provided with my improved apparatus. Fig. 2 is a vertical section of a house, showing the location of the receptacles for the urine and excrement, respectively. Fig. 3 is a horizontal section of the same. Fig. 4 is an enlarged detail view of a hopper and its connecting-pipes. Fig. 5 is an enlarged view showing a hopper provided with a urine-receptacle, a separating-partition, and ventilating apparatus. Fig. 6 is a top plan view of the device shown in Fig. 5. Fig. 7 is a section of an outhouse, showing the receptacles out of alignment with each other, and showing a single ventilating-pipe located between them or located above a point between them. Fig. 8 is a horizontal section of Fig. 7. Fig. 9 is a vertical section of outhouse and barrels. Figs. 10 and 11 are details of air-flue.

The object of my invention is to provide an outhouse which will be adapted for use in localities where water is scarce, or where it is either or both impracticable or undesirable to use water for flushing or draining.

Another object of my invention is to provide a dry outhouse which will be absolutely odorless in the auditory or reception-room.

Another object of my invention is to construct an odorless dry outhouse on such sanitary principles and with such sanitary appliances as will secure the best possible results and reduce to a minimum the liability of the formation and accumulation of foul and poisonous gases, which are so fatal to the health and comfort of persons who are obliged to use the ordinary unimproved and ill-constructed cesspools which are in general use where water cannot be easily and cheaply utilized; and to that end my inventing consists in providing receptacles for the urine and the solid excrement, respectively, and to so construct my outhouse that the urine and solid matter will be conducted to distinct and separate receptacles without being mixed, and locating these receptacles below the surface of the ground.

It further consists in certain details of construction for conducting and separating the liquid and solid waste matter, and in providing certain ventilating apparatus, as will be hereinafter fully explained, and particularly pointed out in the claims at the end of the specification.

In the accompanying drawings, A designates a ventilating-flue, which is located at a point with relation to the receptacles B to conduct the foul air through the means of suitable pipes and connections from both receptacles and hoppers up and out at the top B'. Each of the receptacles B B is provided with a perforation, $b\,b$, into which fits a sleeve, $c\,c$, which in turn connects telescopically with pipes $d\,d$ on the hoppers and with the lower end of the ventilating-flue A, respectively, as will be clearly seen in Figs. 2 and 7. The ventilating-flue A may be provided with perforations $a\,a$, and in some instances I provide hoods $a'\,a'$; or the ventilating-flue may be left open at the bottom, as shown in Fig. 7.

Referring now to Fig. 1, I show a urinal or trough, C, which is located between the doors D D of the outhouse. This urinal or trough C C inclines from its outer edge down to the lower back part of the same, where it communicates directly with a pipe, E. This pipe E conducts the urine from the trough C to the receptacle B. Another pipe, F, runs from a perforation in the lower part of the trough C up to and into the ventilating-flue A. This pipe F is a ventilating-pipe for conducting any disagreeable and unhealthful odor up through the ventilating-flue A to the surrounding atmosphere above the top of the outhouse. The joints between the conducting-pipe E and the ventilating-flue A and the receptacle B and the ventilating-flue A are practically air-tight; but should any leak occur any accumulation of gases or offensive odors will escape through the perforations $a$ in the ventilating-flue A. The hoppers G G are directly in front of the doors D D and are directly above the receptacles B B, as shown in Figs. 1 and 2.

For saloons and other public places, where the outhouse is used frequently, I construct the house on the plan shown in Fig. 1, where the urinal or trough C may be used independent of the hoppers G G, which hoppers are provided with the ventilating-pipes $g$ $g$, which establish communication between the pipes $d$ $d$ and the ventilating-flue A.

In the hopper shown in Fig. 5 I provide a urine separator and hopper, I, which is separated from the interior of the hopper G by the partition $h$, and is provided at its bottom with a perforation, $i$, which is in alignment with the bottom of the ventilating-pipe J, which communicates with the lower supplemental hopper, K, of the urinal. This supplemental hopper K is provided with a duct, $k$, which empties into the urine-receptacle B. The bottom of the hopper G extends slightly below the line of the bottom of the ventilating-pipe $g$.

By referring to Fig. 8 it will be observed that the ducts $k$ $k$ communicate with a central pipe, $k'$, which empties into the urine-receptacle B, which in this figure is located back of the two receptacles which come directly beneath the hoppers G G, while the ventilating-pipes J J pass diagonally back and communicate directly with the ventilating-flue A.

From the foregoing it will be readily understood that an outhouse constructed on the plan described and provided with hoppers, as shown in detail in Figs. 4 and 5, and with connecting-pipes, as best shown in Figs. 2 and 3, the separation of the urine from the solid or plastic excrement will be automatic and practically perfect. By the exercise of a little judgment all urine may be excluded from the receptacles which are located directly beneath the hoppers G G.

It is obvious, and has been demonstrated by experiment, that an outhouse constructed on this plan is practically odorless and may easily be kept sweet and clean. By constructing the hopper G slightly smaller at its mouth than the interior diameter of the pipe $b$ little or no difficulty will be experienced by the solid or plastic excrement adhering to the interior walls of the conduit above the receptacles B.

I do not wish to be understood as limiting myself to the exact construction shown and described, as it is obvious that several of the details of construction might be changed without departing from the spirit of my invention and without in any way interfering in its usefulness.

Having described the objects, uses, and advantages of my device, and having fully explained a preferred means of carrying the same into practice, what I believe to be new, and desire to secure by Letters Patent of the United States, and what I therefore claim as my invention, is—

1. In an odorless dry outhouse, the combination of the flue A, open at its bottom and communicating with the urine-receptacle and suspended within the outhouse, the hoppers G, provided with ventilating-pipes which communicate with the pipe A, and the urine-receptacles provided with ventilating-pipes which connect with the flue A, and a conduit which conducts the urine into an independent urine-receptacle, the only opening into which receives the conduit from the urinal, substantially as and for the purposes specified.

2. In an odorless dry outhouse, the vault having excrement-receptacles and an independent urine-receptacle located therein, the excrement-hoppers located above the excrement-receptacles and provided with air-ducts which communicate directly with a single air-flue, A, in combination with urine-hoppers secured to the excrement-hoppers and provided with air-ducts which also communicate with the air-flue A, and downwardly-inclined pipes which conduct the urine into the independent urine-receptacle, and an air-flue, A, connected to the independent urine-receptacle and extending up and out of the vault and outhouse, substantially as and for the purposes specified.

In testimony whereof I affix my signature in presence of two witnesses.

THOMAS W. CARRICO.

Witnesses:
JOHN SCHORN,
C. UPSON.